United States Patent [19]
Kaehler et al.

[11] Patent Number: 6,078,896
[45] Date of Patent: *Jun. 20, 2000

[54] VIDEO IDENTIFICATION FOR FORECOURT ADVERTISING

[75] Inventors: David L. Kaehler; Joseph D. Long, both of Greensboro, N.C.

[73] Assignee: Marconi Commerce Systems Inc., Greensboro, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/964,870

[22] Filed: Nov. 5, 1997

[51] Int. Cl.$^7$ .................................................... G06F 17/60
[52] U.S. Cl. .......................... 705/14; 235/381; 235/383; 221/1; 221/8; 221/9; 222/1; 222/52
[58] Field of Search ........................ 705/14, 413; 348/8, 348/9, 634, 510, 460, 159; 386/106, 61, 463, 95; 235/381, 383; 221/1, 8, 9; 222/1, 52

[56] References Cited

U.S. PATENT DOCUMENTS

| | | | |
|---|---|---|---|
| 3,732,365 | 5/1973 | Rando et al. | 348/634 |
| 4,086,005 | 4/1978 | Honebrink et al. | 352/133 |
| 4,216,492 | 8/1980 | Schmalz | 386/1 |
| 4,426,728 | 1/1984 | Kahn | 381/15 |
| 4,498,098 | 2/1985 | Stell | 348/510 |
| 4,534,054 | 8/1985 | Maisel | 381/4 |
| 4,660,153 | 4/1987 | Yamashita et al. | 704/270 |
| 4,750,130 | 6/1988 | Shimamura et al. | 705/413 |
| 4,814,883 | 3/1989 | Perine et al. | 348/460 |
| 4,837,638 | 6/1989 | Fullwood | 386/61 |
| 4,855,827 | 8/1989 | Best | 348/485 |
| 4,862,268 | 8/1989 | Campbell et al. | 348/463 |
| 4,956,709 | 9/1990 | Richer et al. | 348/634 |
| 4,967,366 | 10/1990 | Kaehler | 700/237 |
| 4,974,085 | 11/1990 | Campbell et al. | 348/460 |
| 4,995,026 | 2/1991 | Makabe et al. | 369/70 |
| 5,008,749 | 4/1991 | Ruckert | 348/495 |
| 5,019,905 | 5/1991 | Pshtissky et al. | 348/159 |
| 5,027,426 | 6/1991 | Chiocca, Jr. | 455/5.1 |
| 5,029,014 | 7/1991 | Lindstrom | 386/106 |
| 5,063,456 | 11/1991 | Horiuchi et al. | 386/44 |
| 5,097,348 | 3/1992 | Suetaka | 386/95 |
| 5,099,319 | 3/1992 | Esch et al. | 348/9 |
| 5,119,503 | 6/1992 | Mankovitz | 455/45 |
| 5,134,716 | 7/1992 | Craig | 455/66 |
| 5,140,420 | 8/1992 | Hurst | 348/478 |
| 5,200,822 | 4/1993 | Bronfin et al. | 348/460 |

(List continued on next page.)

FOREIGN PATENT DOCUMENTS

| | | |
|---|---|---|
| B49358/90 | 8/1990 | Australia . |
| 0 212 359 | 3/1987 | European Pat. Off. . |
| 0 493 881 A2 | 8/1992 | European Pat. Off. . |
| 0 532 277 A2 | 3/1993 | European Pat. Off. . |
| 2 060 312 A | 4/1981 | United Kingdom . |
| WO 89/07807 | 8/1989 | WIPO . |
| WO92/15175 | 9/1992 | WIPO . |

*Primary Examiner*—Emanuel Todd Voeltz
*Assistant Examiner*—Raquel Alvarez
*Attorney, Agent, or Firm*—Coats & Bennett, P.L.L.C.

[57] ABSTRACT

A fuel dispenser includes fuel delivery components located in a service station, a card reader for reading customer credit or debit cards, a customer data input mechanism, and a video infeed line for infeeding a video signal including advertising of a product available for sale at the service station and data about the advertisement in a closed-captioning portion of the video signal. The dispenser also includes a video display screen arranged to receive the video signal and display the advertisement as a visible video program, a memory of information about products that may be advertised, and a data controller adapted to control data for the card reader and capable of reading data from the closed-captioning portion of the video program for use in a manner independent of affecting the way the visible video program is displayed. The data may, for example be used to count the number of times a particular video program is shown; trigger a product price display on the video display screen from the memory when an advertisement of a selected product is being displayed, or indicate data input options to enable the customer to purchase the advertised product.

26 Claims, 6 Drawing Sheets

---

CLOSED CAPTION EXAMPLE

| PRODUCT GROUP | BRAND ID | PACKAGE QTY | SPECIFIC VIDEO ID | MISC. | |
|---|---|---|---|---|---|
| SODA | COKE | 24 CASE | 16 DIGIT UNIQUE ID WITH 2 THE PRODUCT GROUP/BRAND ID | EX.... START DATE FOR PROMO | ETC. |
| CANDY | PEPSI | 18 CASE | | START DATE FOR PROMO | |
| BEER | MT. DEW | 12 CASE | | CAN PRODUCT BE PURCHASED | |
| GENERIC | | 6 PACK | | | |
| LOCAL STATION DATA | | 1 SINGLE | | | |

U.S. PATENT DOCUMENTS

| | | | |
|---|---|---|---|
| 5,200,825 | 4/1993 | Cloutier et al. | 348/564 |
| 5,216,500 | 6/1993 | Krummey et al. | 348/79 |
| 5,289,272 | 2/1994 | Rabowsky et al. | 348/8 |
| 5,343,239 | 8/1994 | Lappington et al. | 348/12 |
| 5,398,070 | 3/1995 | Lee | 348/553 |
| 5,416,526 | 5/1995 | Yamamoto | 348/484 |
| 5,493,315 | 2/1996 | Atchley | 345/516 |
| 5,535,130 | 7/1996 | Long | 364/479.01 |
| 5,543,849 | 8/1996 | Long | 348/460 |
| 5,719,781 | 2/1998 | Leatherman et al. | 700/232 |
| 5,847,771 | 12/1998 | Cloutier et al. | 348/564 |

CLOSED CAPTION EXAMPLE

| PRODUCT GROUP | BRAND ID | PACKAGE QTY | SPECIFIC VIDEO ID | MISC. |
|---|---|---|---|---|
| SODA | COKE | 24 CASE | 16 DIGIT UNIQUE ID WITH 2 THE PRODUCT GROUP/BRAND ID | EX.... START DATE FOR PROMO |
| CANDY | PEPSI | 18 CASE | | START DATE FOR PROMO |
| BEER | MT. DEW | 12 CASE | | CAN PRODUCT BE PURCHASED |
| GENERIC | | 6 PACK | | |
| LOCAL STATION DATA | | 1 SINGLE | | ETC. |

FIG. 6

VIDEO IDENTIFICATION FOR FORECOURT ADVERTISING

BACKGROUND OF THE INVENTION

The present invention relates to improvements in fuel dispensers, particularly those featuring video displays in the fuel dispenser to assist in various aspects of fuel dispensing in service station functionalities. It is known from U.S. Pat. No. 5,535,130 to Long that video displays and fuel dispensers can be fed with video signals from a central source in a service station environment. Service station environments are becoming useful for marketing much more than fuel, including the goods usually sold in convenience stores, as well as products sold from quick-serve restaurants, which are increasingly becoming associated with service stations.

The Long patent discloses a way to provide coordinated timing for displaying a video display on a fuel dispenser so that the fuel dispenser starts displaying the video program, typically an advertisement, at its beginning. Thus, the customer is shown a clean, crisp advertisement, and the expense of providing unique video signal feeds for each of the dispensers in the service station is eliminated.

Nonetheless, the functionality of the apparatus disclosed in the Long patent is limited. Once the advertisement is displayed to the customer, it is up to the customer to decide what, if anything, he will do in response. In addition, since the fuel dispenser merely displays the video program as a "dumb feed" without regard to the material being fed, opportunities to use the information in the material are missed. That is, a fuel dispenser that displays an advertisement or other message and is given information as to what the message is that is being displayed could be exploited for further advantage by the service station operator.

SUMMARY OF THE INVENTION

The invention fulfills this need in the art by providing a fuel dispenser having video display capabilities including fuel delivery components, a video infeed line for infeeding a video signal that has data in an non-displayed portion of the video signal, a video display screen arranged to receive the video signal from the video infeed line and display a visible video program, and a data controller having an infeed from the video infeed line and capable of reading data from the non-displayed portion of the video program for use in a manner independent of the visible video program to be displayed. The independent manner may include the addition of an additional display that does have an affect on the visible video program.

Preferably, the non-displayed portion of the video program is a closed-captioning portion. Typically, the dispenser also includes a card reader for reading customer credit or debit cards, and the data controller also handles data to and from the card reader.

In one embodiment, the data controller counts the number of times a particular video program is shown.

The dispenser may include a memory of information of products that may be advertised on the video display screen. The controller triggers a further display on the video display from the memory when data in the non-displayed portion of the video program indicates an advertisement of a selected product is being displayed. The fuel dispenser may be located in a service station, with the video program an advertisement of a product for sale at the service station, and the further display may indicate the price the service station charges for the advertised product. The fuel dispenser may also include a customer data input mechanism, and the further display may indicate data input options to enable the customer to purchase the advertised product.

The price display and data input order options can be simultaneous with the advertisement, or follow it.

In a preferred embodiment, the data about an advertisement includes data elements in a hierarchy. A preferred hierarchy includes data elements for a product group, brand identification, package quantity, identification of the specific video-program, and a miscellaneous data field. The miscellaneous data field may hold various data, such as whether the product can be ordered locally and running dates for the video program.

The invention also provides a method of vending fuel including providing a fuel dispenser having video display capabilities, feeding the fuel dispenser with a video signal that has data in an non-displayed portion of the video signal, displaying a visible video program on a video display screen from the video infeed line, reading data from the non-displayed portion of the video program, and using the data in a manner independent of the display of the visible video program.

Preferably, the reading step includes reading the data from a closed-captioning portion of the video program.

The using step may include counting the number of times a particular program is shown.

The using step may also include triggering a further display on the video display from a memory in the dispenser when data in the non-displayed portion of the video program indicates an advertisement of a selected product is being displayed. The further display may indicate the price to be charged for the advertised product. The further display may indicate data input options to enable the customer to purchase the advertised product. The infeeding step preferably includes infeeding data about an advertisement including data elements in a hierarchy, as noted above.

BRIEF DESCRIPTION OF THE DRAWINGS

The invention will be better understood from a reading of the Detailed Description of the Preferred Embodiment and a review of the Drawings in which:

FIG. 6 is a graphical depiction of a hierarchical data arrangement useful in the invention.

DETAILED DESCRIPTION OF THE PREFERRED EMBODIMENT

As noted above, the present invention relates to an improvement in the apparatus disclosed in prior U.S. Pat. No. 5,535,130 to Long, the entire disclosure of which is incorporated herein by reference. In addition, like the Long patent disclosure, the invention may be used in conjunction with the inventions described in Gilbarco Inc.'s U.S. Pat. No. 5,493,315 entitled "Video Display Control" of Hans Atchley, and pending applications entitled "Multi-media Graphics in Fuel Dispensers" of Russel Dean Leatherman and Walter Baker, Ser. No. 07/960,512, filed Oct. 13, 1992, and "Transaction Display on Video/Graphics in Fuel Dispensers" of Russel Dean Leatherman et al., Ser. No. 08/459, 662 filed Jun. 2, 1995. The disclosures of that patent and those two applications are hereby incorporated herein by reference.

Figure 1:
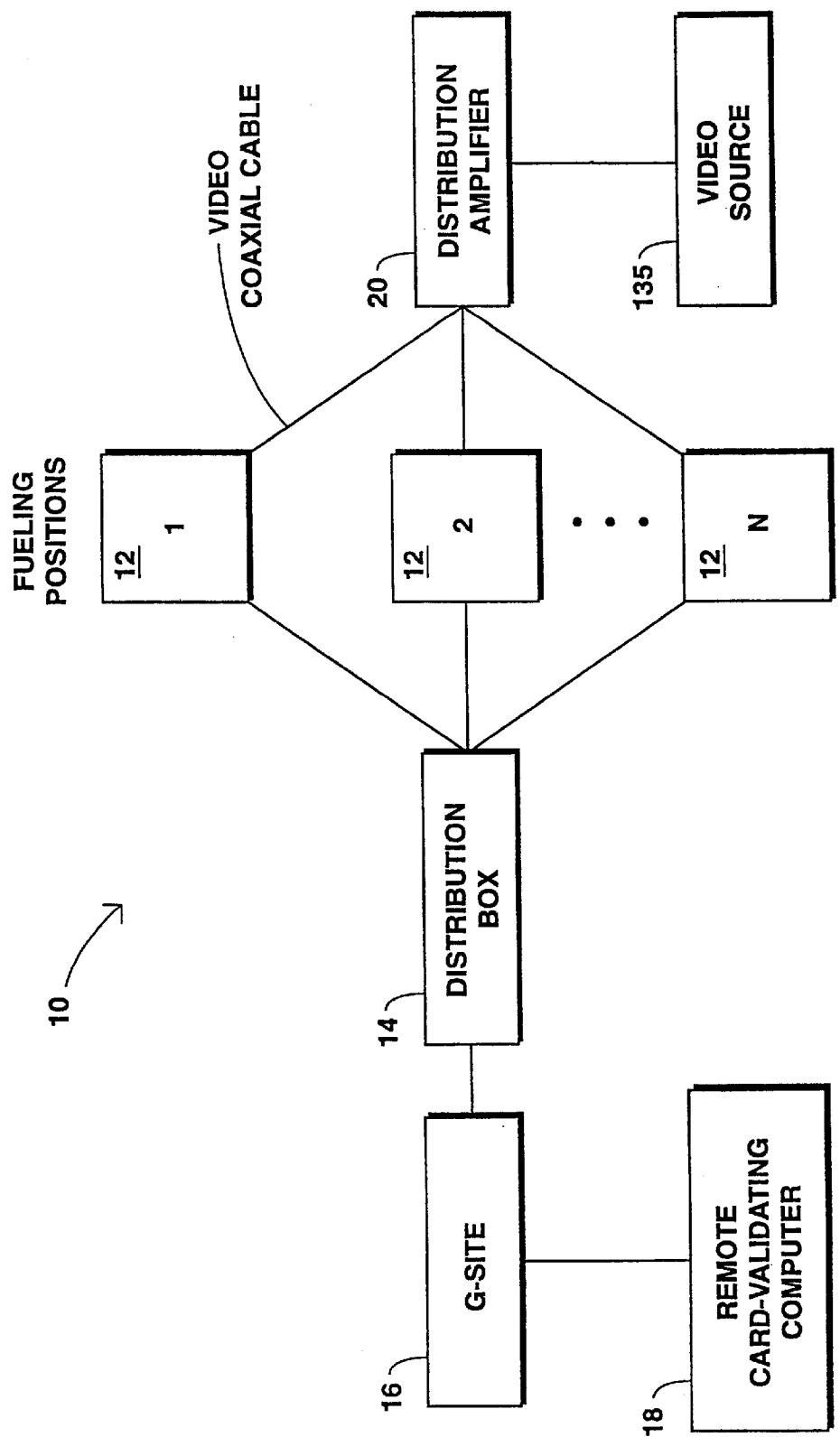
FIG. 1 is a block diagram of a service station illustrating major components of a preferred embodiment according to the present invention as linked together.

As seen in FIG. 1, a service station 10 has on site a plurality of fuel dispensers 12 connected through a single distribution box 14 to a site controller 16. The site controller 16 is preferably the G-Site™ system controller sold by Gilbarco Inc. of Greensboro, N.C. The controller 16 serves as an overall system controller for the multiplicity of fuel dispensers 12. It has a link to a remote credit- or debit-card-validating computer 18, such as a telephone link. The computer 18 may be hundreds or thousands of miles away from the service station, at the site of a card-issuing authority or the like.

The relationships of the dispensers 12, distribution box 14, controller 16, and computer 18 are conventional as regards the card-validating function. The controller 16 serves as a point-of-sale device somewhat like a cash register manned by an attendant, typically located in a store facility.

Each of the dispensers 12 is supplied with a video signal from a video source 135 through a distribution amplifier 20. It should be appreciated that each of the dispensers 12 is supplied with exactly the same signal, decreasing the investment required in video sources 135. Alternatively, of course, multiple video sources could be provided if desired. However, an important advantage of the invention is that it makes possible the use of only a single source. The source may be any suitable source of video signals such as a video tape recorder, a video disk, a live camera, an over-the-air or over-cable reception, the Internet or the like. The video may be any desired format such as RGB, Composite video or S-Video.

Figure 2:
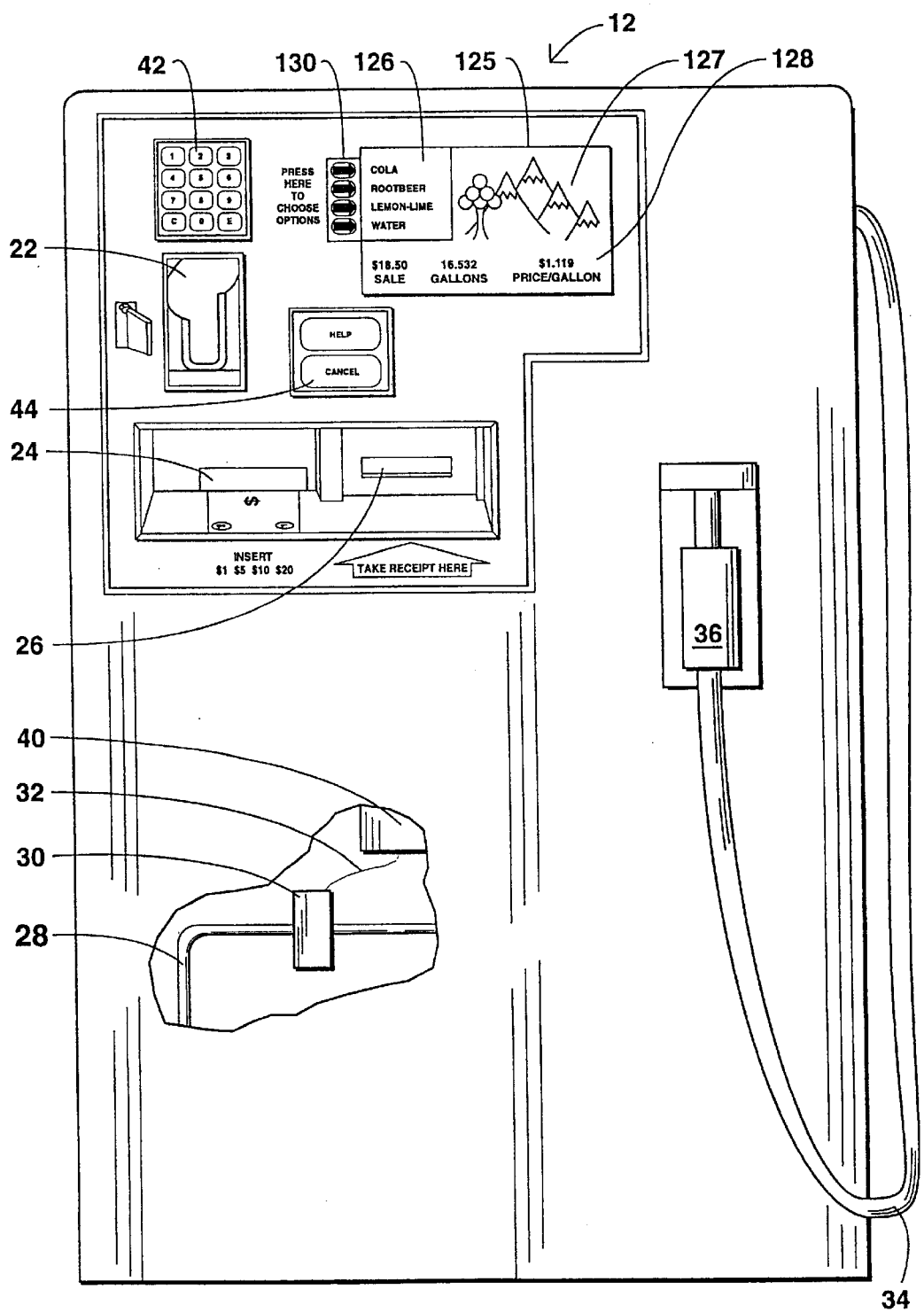
FIG. 2 is an elevational view of a fuel dispenser of FIG. 1, partially broken away.

Turning now to FIG. 2, which shows an elevational view of one of the dispensers 12, the dispenser includes a conventional nozzle 36 connected through a hose 34 to the dispenser housing, for dispensing gasoline or other fuel in a conventional fashion. The fuel is supplied from an underground reservoir through a conduit 28 to the hose 34 under the influence of a submerged pump 27, shown schematically in FIG. 3. A metering device 30 from the conduit 28 ascertains the volume of fuel delivered through the conduit 28 and communicates that data over a line 32 to microprocessor 40 in the dispenser 12. The volume is, of course, used to compute and display the transaction data.

The dispenser may also include a magnetic stripe card reader 22, a cash accepter 24, and a receipt printer 26, all of any desired design.

Referring to FIG. 2, the video screen 125 can be seen displaying in a portion of the screen 126 information concerning a possible beverage purchase transaction which can be elected by a customer in combination with a fueling transaction. Other types of customer selectable options can be substituted. The screen 125 may be any suitable raster-scannable display, but preferably is a liquid crystal display. Associated with the video display portion 126 is a keypad 130 similar to those conventionally used with bank automated teller machine displays. The key pad 130 provides a mechanism for a customer to make a data input to the dispenser 12. That is, a plurality of keys 130 are aligned with the portion 126 of raster-scannable display 125 so that the effect of pressing one or more of the keys 130 is explained to a user by the display on the portion 126. Other keypads 130 on other sides of the display 125 may be provided. Additional keypads 42, 44 are provided for further transaction entry data to the CRIND™ microprocessor 140 (see FIGS. 3 & 4), in conventional fashion. "CRIND" is an acronym for "Card Reader in Dispenser," a style of fuel dispenser sold by Gilbarco Inc. of Greensboro, N.C. Other fuel dispenser manufacturers make similar units. Usage of the term CRIND™ in this application means fuel dispensers having card reader capabilities, which typically include the capability of communication of card information to a station controller. If desired, the apparatus could be configured for data input through a touch screen version of screen 125.

The screen 125 has a further portion 127 which depicts video images as transmitted from the station video signal source 135. The screen 125 further has a portion 128 on which is depicted the transaction details for a fueling transaction. The fueling transaction information shown in the portion 128 includes the total currency amount for a fueling transaction, the volume dispensed, usually gallons or liters, and the cost per volume. If desired, the transaction data can be displayed separately from screen 125.

The information depicted in the portion 127 can be any desired information, typically of video origin. Thus, advertisements, promotions of community activities or simply, aesthetically attractive scenes can be depicted in a portion 127. In the present invention, the information is preferably advertising that is linked to the transaction enabled by the screen portion 126.

In FIG. 2, the portions 126 and 127 are shown side by side above the portion 128, but any other suitable arrangement of the three portions can be used. However, since the portion 126 typically depicts user prompts for responses such as through the keypad 130, it is desirable to locate portion 126 adjacent to keypad 130. Of course, keypad 130 can be configured other than as shown in FIG. 2. Also, the location of the three portions 126, 127, 128 can change over time under the control of display microprocessor 240 supplying the signals to the screen 125.

Figure 3:
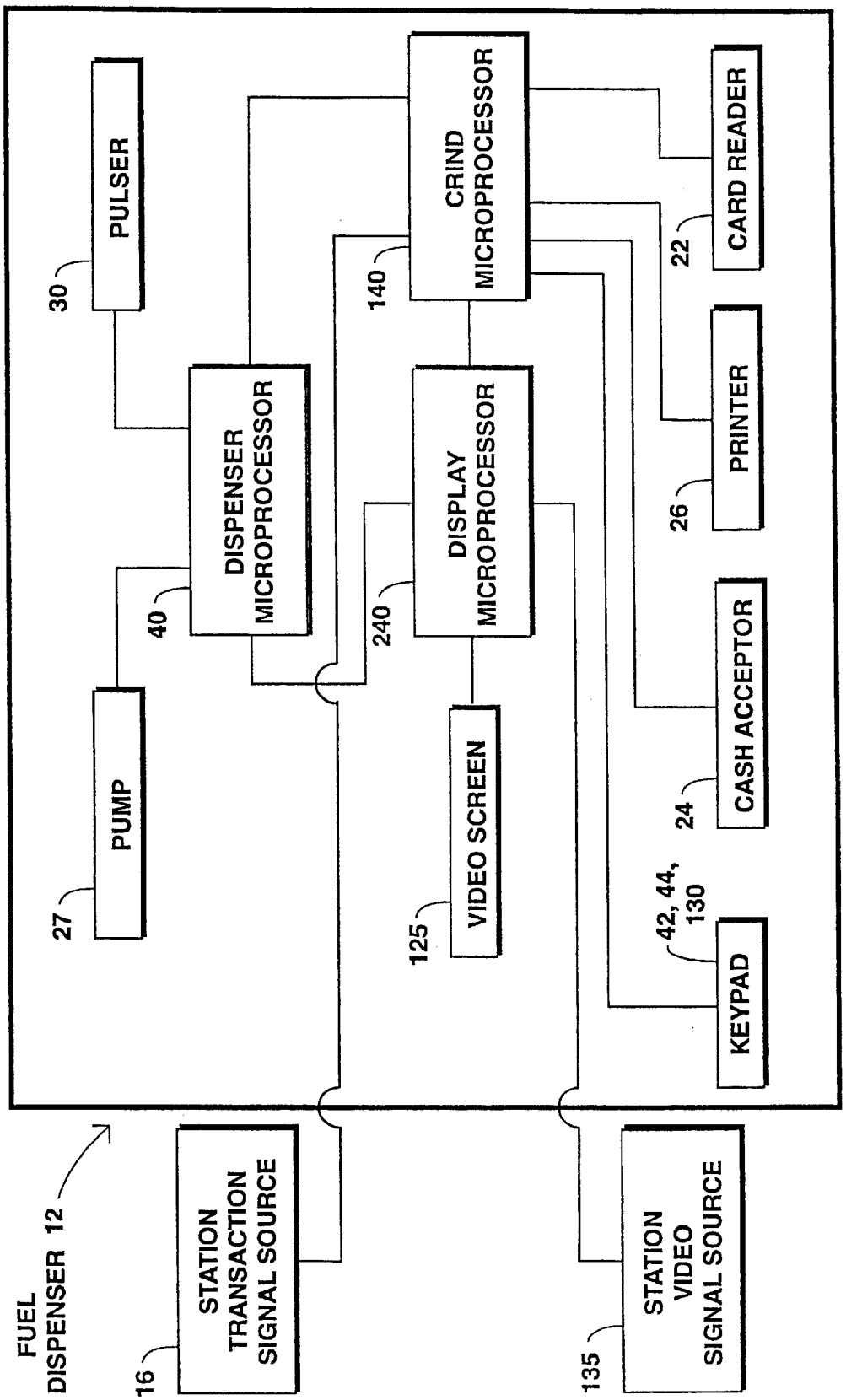
FIG. 3 is a block diagram of various components of the electronics used in a dispenser according to one embodiment.

Referring now to FIG. 3, the video display to the screen 125 is controlled by a display microprocessor 240 which receives input of fueling information from dispenser microprocessor 40, user prompts and other data from CRIND™ microprocessor 140, and video signals from the station video signal source 135. These three signals can be mixed and controlled for location on the screen using the techniques described in U.S. patent application Ser. No. 07/960, 512 filed Oct. 13, 1992, the entire disclosure of which is incorporated herein by reference. Microprocessor 240 may be programmed to convert either the video or the graphics signals to be compatible with the other, such as both RGB, both Composite video or both S-Video.

Input to the display microprocessor 240 from the dispenser microprocessor 40 will be data concerning fuel pumped, which is delivered to the dispenser microprocessor 40 from the metering device, such as pulser 30. The dispenser microprocessor 40 receives commands to dispense fuel from the CRIND™ microprocessor 140 in conventional fashion, thus, activating the pump 27. The CRIND™ microprocessor 140 receives inputs from the keypads 42, 44, cash acceptor 24, card reader 22, dispenser microprocessor 40, and station transaction signal sources 16 in conventional fashion. The CRIND™ microprocessor 140 outputs transaction data to the display microprocessor 240 for combination with the other signals to be displayed on video screen 125. The CRIND™ microprocessor 140 can output to printer 26 to print a receipt at the end of a transaction. The operation of the CRIND™ microprocessor 140 with the dispenser microprocessor 40, card reader 22, printer 26, cash acceptor 24, keypads 42, 44, and station transaction signal source 16 to authorize a card or cash transaction, dispense fuel and show a basic video program is conventional and needs no further elaboration here.

Figure 4:
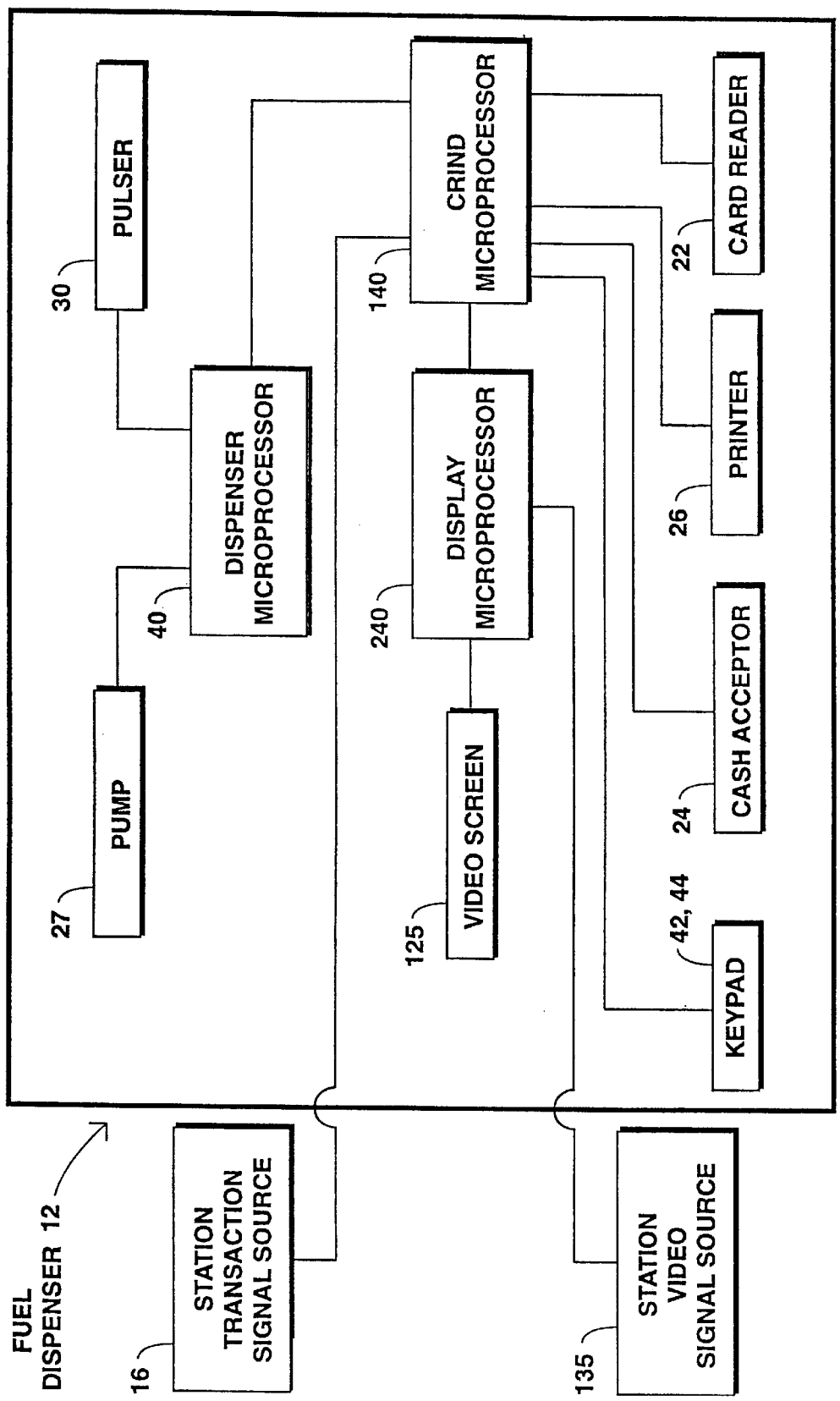
FIG. 4 is a block diagram of various components of the electronics used in a dispenser according to an alternate embodiment.

FIG. 4 depicts a system similar to FIG. 3 except that the dispenser microprocessor 40 solely outputs data to the CRIND™ microprocessor 140, rather than the display microprocessor 240. In this embodiment, the CRIND™ microprocessor 140 handles the data concerning the volume of liquid dispensed from the dispenser microprocessor 140, and calculates the current dollar value of the amount dispensed and outputs the same, together with the volume dispensed through the display microprocessor 240, which properly locates them on the video screen 125, along with user prompts as in the embodiment of FIG. 3.

Typically, for a dispenser 12 having two dispensing sides, only one dispenser microprocessor 40 is provided. Each side is provided with a CRIND™ microprocessor 140 and a display microprocessor 240 as well as the peripherals 22, 24, 26, 42, 44 and 125.

Figure 5:
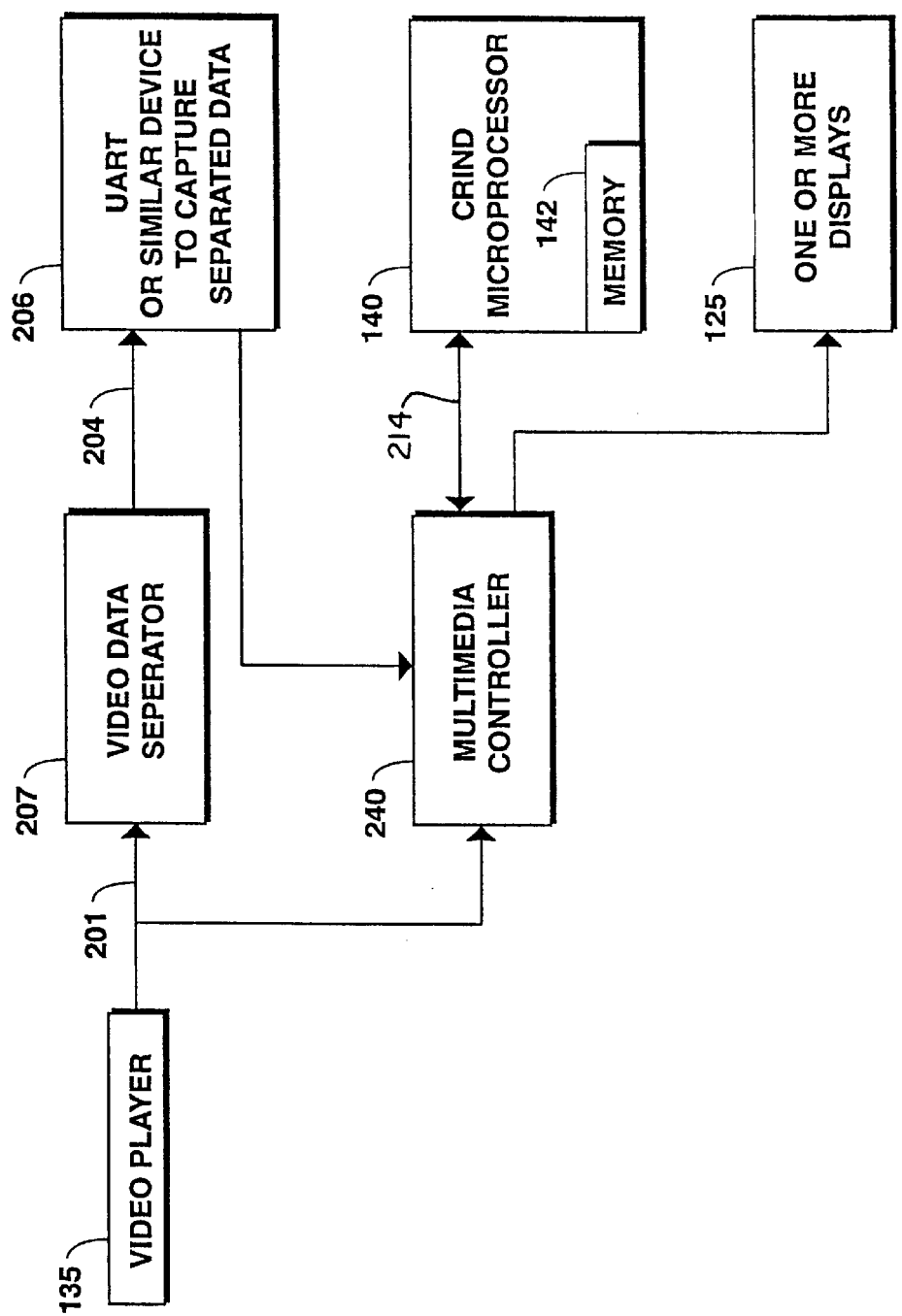
FIG. 5 is a block diagram of a subsystem for extracting and using informational signals in a video program.

Referring now to FIG. 5, fuel dispenser details can be seen. The remote video player 135 provides a video signal which preferably has imbedded data per ANSI EIA-608, as an undefined, extended data packet. The video signal is fed along line 201 to a video data separator 207, typically a closed caption decoder. The separator 207 may supply data on line 204 to UART 206 or similar device to capture separated data. The data is fed from the UART 206 to multimedia controller 240 along with the video signal from video player 135. The controller 240 may have an associated memory (not shown). The controller 240 passes the data to CRIND microprocessor 140 and its associated memory 142, for handling as described below. The CRIND microprocessor may also provide control instructions and/or data 214 to the multimedia controller 240, to direct the controller to make display combinations on the video display 125. The CRIND™ 140 can interpret the closed-captioning signals. In a preferred embodiment, the signals are provided in a particular hierarchical form. FIG. 6 shows an example of the type of data which can be stored in a closed-caption portion of the video signal. Note that from left to right, most significant to less significant data is provided in the grouping of product group, brand ID, package quantity, specific video ID and miscellaneous.

The miscellaneous data field can receive various types of information including dates when promotional prices are to be provided which can be acted upon by the CRIND™ 140 to select among various stored prices for a product, as well as general information as to whether the product is available for sale at the service station or just a general advertisement of a product which might be purchased at some other venue. The CRIND™ may match up the data read off of the closed-captioning input in its particular hierarchical form with the data stored in the CRIND™ memory in a linked list in accordance with the invention of Hans Atchley described in U.S. Pat. No. 5,493,315.

The CRIND™ microprocessor includes a memory 142 which stores data about the products which may be advertised provided to the CRIND™ through connection 16 to the station store. The CRIND™ looks up the data read from the closed-captioning information in the stored data to find a match. If a match is found, information such as the price stored in the memory 142 is supplied over line 214 to the multi-media controller 240 to overlay on the video ad being displayed on media display 125 in known fashion. For example, if the advertisement being displayed is for a soft drink, the closed captioning data indicates that that is the case. The CRIND™ 140 selects drink-specific data from its memory 142 to display in the screen area 126 adjacent the advertisement appearing in screen area 127. As seen in FIG. 2, the drink selection available is shown on the screen area 126, derived from the data provided over line 214. In this embodiment, the CRIND™ 140 receives data of the selection of a drink by a customer's pressing the corresponding key 130, adds the purchase price to the amount of the fuel sale, and indicates to the service station controller 16 that the selected drink is to be made available to the customer.

Alternatively, the CRIND™ can be programmed to wait until after the completion of display of the video program to display the information. In another alternative, the CRIND™ can be programmed to wait until after the display of the video program and then provide the stored video prompt to assist a customer ordering product such as providing meaningful video displays 126 adjacent keypad selections 130 on the CRIND™. From there, the CRIND™ can relay the customer's selections to the station store controller or quick-serve restaurant, as the case may be, in the manner disclosed in copending U.S. patent application No. 08/459,662, filed Jun. 2, 1994.

In another option of the way that the CRIND™ 140 can use the data provided on the closed-caption portion of the video program, the CRIND™ can simply maintain a storage area in memory 142 of the different types of commercials that are capable of being shown and increment a stored number for each commercial indicating the number of times that it is shown. Or, that information can be stored elsewhere, such as at controller 16. Commercial advertisers will pay to have their commercials shown, as long as there can be some accounting for the number of customer presentations of the commercial, and this embodiment provides a means for counting the number of commercial presentations. The incremented number can be read out over a line to station transaction signal source 16.

Once the video identification capability is available in the closed-caption band, the apparatus can make the closed-caption data available to the CRIND™ application 140. The CRIND™ application 140 can then process the data for such things as counting the number of times a specific product group was displayed to customers, counting the number of times a specific video within a product group was displayed to customers, or it can match a product group ID with a local table of ID's upon a match. The CRIND™ 140 can then display a graphic overlay on top of the video to advertise a local price for the advertised product. Thus, the customer is prompted to determine whether or not he or she wishes to order the product at the locally advertised price. As can be appreciated, the advertisement which is stored on the main video source 135 for the service station may very well be manufactured in a production facility having no relationship to the price to be charged at the local service station, so that information about the local service station price can be independently sourced in this fashion.

Since the invention can identify the specific video being displayed and match that with a table of local videos, the local manager of the service station is capable of merchandising the advertised products in conjunction with the displayed videos. In addition, the manager can repay revenue by physically counting the number of times advertising is physically displayed to each of the customers.

Those of ordinary skill in the art will be able to work with their existing knowledge of fuel dispensers and the specifics discussed herein to write suitable software and to configure hardware details to assemble various embodiments according to the invention.

Those of ordinary skill in the art will recognize that the invention as disclosed herein may be implemented in numerous embodiments which differ from the specific disclosure hereof. All such embodiments which fall within the scope of the appended claims are deemed to be within the scope of the patent.

What is claimed is:

1. A fuel dispenser having video display capabilities comprising
   fuel delivery components,
   a video infeed line for infeeding a streaming video signal that has a plurality of visible video programs and data in a non-displayed portion of the video signal relating to the corresponding visible video program,
   a video display screen arranged to receive the video signal from said video infeed line and display the visible video programs, and
   a data controller having an infeed from said video infeed line and capable of reading data from the non-displayed portion of the video signal to control the data controller in relation to the visible video programs and for use in a manner independent of affecting the way the visible video program is displayed.

2. A fuel dispenser as claimed in claim 1 wherein said non-displayed portion of the video program is a closed-captioning portion.

3. A fuel dispenser as claimed in claim 1 further comprising a card reader for reading customer credit or debit cards and wherein said data controller also controls data for said card reader.

4. A fuel dispenser as claimed in claim 1 wherein said data controller uses the data from the non-displayed portion to count the number of times a particular video program is shown.

5. A fuel dispenser as claimed in claim 1 further comprising a memory of information about products that may be advertised on said video display screen and wherein said data controller triggers a further display on the video display from said memory when data in the non-displayed portion of the video program indicates the display of an advertisement of a selected product.

6. A fuel dispenser as claimed in claim 5 wherein the fuel dispenser is located in a service station and the visible video program is an advertisement of a product for sale at the service station and the further display indicates the price the service station charges for the advertised product.

7. A fuel dispenser as claimed in claim 5 wherein the fuel dispenser further comprises a customer data input mechanism and is located in a service station, the visible video program is an advertisement of a product for sale at the service station and the further display indicates data input prompts to enable the customer to purchase the advertised product.

8. A fuel dispenser as claimed in claim 7 wherein the data controller is configured to permit a customer to purchase the advertised product by actuation of said customer data input mechanism.

9. A fuel dispenser as claimed in claim 8 wherein the further display is situated on the video display screen adjacent said customer data input mechanism.

10. A fuel dispenser as claimed in claim 5 wherein said data about an advertisement includes data elements in a hierarchy.

11. A fuel dispenser as claimed in claim 10 wherein said hierarchy includes data elements for a
    a) product group,
    b) brand identification,
    c) package quantity,
    d) identification of the specific video-program, and
    e) a miscellaneous data field.

12. A fuel dispenser as claimed in claim 11 wherein the miscellaneous data field holds data selected from the group consisting of
    a) whether the product can be ordered locally,
    b) running dates for the video program,
    c) product price, and
    d) a combination of more than one of a), b) and c).

13. A fuel dispenser having video display capabilities comprising
    fuel delivery components located in a service station,
    a card reader for reading customer credit or debit cards,
    a customer data input mechanism,
    a video infeed line for infeeding a streaming video signal including advertising of a product available for sale at the service station and that has data in a closed-captioning portion of the video signal about the advertisement including data elements in a hierarchy, wherein said hierarchy includes data elements for a
    a) product group,
    b) brand identification,
    c) package quantity,
    d) identification of the specific video-program, and
    e) a miscellaneous data field.
    a video display screen arranged to receive the video signal from said video infeed line and display an advertisement as a visible video program,
    a memory of information of products that may be advertised on said video display screen, and
    a data controller adapted to control data for said card reader and having an infeed from said video infeed line and capable of reading data from the closed-captioning portion of the video program for use in a manner selected from the group consisting of:
    a) counting the number of times a particular video program is shown;
    b) triggering a further display on the video display screen from said memory when data in the closed-caption portion of the video program indicates an advertisement of a selected product is being displayed; and
    c) triggering a further display on the video display screen from said memory when data in the closed-caption portion of the video program indicates the display of an advertisement of a selected product, the further display indicating the price the service station charges for the advertised product.

14. A method of delivering video at a fuel dispenser comprising:
    providing a fuel dispenser having video display capabilities,
    feeding the fuel dispenser with a streaming video signal that has a plurality of visible video programs and data in a non-displayed portion of the video signal relating to the corresponding visible video program, displaying the visible video programs on a video display screen from said video infeed line, reading data from the non-displayed portion of said video signal; and using the data to control a data controller in relation to the visible video programs in a manner independent of affecting the way the visible video program is displayed.

15. A method of vending fuel as claimed in claim 14 wherein the reading step includes reading the data from a closed-captioning portion of the video program.

16. A method of vending fuel as claimed in claim 14 wherein the using step includes counting the number of times a particular video program is shown.

17. A method of vending fuel as claimed in claim 14 wherein the using step includes triggering a further display on the video display from a memory in the dispenser when data in the non-displayed portion of the video program indicates the display of an advertisement of a selected product.

18. A method of vending fuel as claimed in claim 17 wherein the using step includes triggering a further display that indicates the price to be charged for the advertised product.

19. A method of vending fuel as claimed in claim 17 wherein the using step includes triggering a further display that indicates data input options to enable the customer to purchase the advertised product.

20. A method of vending fuel as claimed in claim 14 wherein the feeding step includes feeding data about an advertisement including data elements in a hierarchy.

21. A method of vending fuel as claimed in claim 20 wherein said hierarchy includes data elements for a a) product group,
b) brand identification,
c) package quantity,
d) identification of the specific video-program, and
e) a miscellaneous data field.

22. A method of vending fuel as claimed in claim 21 wherein the miscellaneous data field holds data selected from the group consisting of a) whether the product can be ordered locally and
b) running dates for the video program.

23. A method of delivering video at a fuel dispenser at a service station comprising:

providing a fuel dispenser having video display capabilities, feeding the fuel dispenser with a streaming video signal that has data in an non-displayed portion of the video signal including feeding data about an advertisement including data elements in a hierarchy including data elements for a a) product group,
b) brand identification,
c) package quantity,
d) identification of the specific video-program, and
e) a miscellaneous data field, displaying a visible video program on a video display screen from said video infeed line, reading data from a closed-captioning portion of the video program, and when data in the hierarchy indicates an advertisement of a selected product configuration on sale at the service station is being displayed, triggering a further display of the price to be charged for the advertised product on the video display from a memory in the dispenser.

24. A method of vending fuel as claimed in claim 23 wherein the triggering step includes triggering a further display that indicates data input options to enable the customer to purchase the advertised product.

25. A method as claimed in claim 24 further comprising activating data input mechanisms on the dispenser to permit a customer to operate the data input mechanisms to purchase the advertised product.

26. A service station comprising a video program signal source providing streaming video signals including visible video programs and data in non-displayed portions of the video signals, a plurality of fuel dispensers linked to and receiving video program signals from said video signal, each dispenser including a memory, data controller and a video screen to display visible video programs from the visible video program signals and indicia from said memory, said controller configured to select the indicia from memory to be displayed based upon data in the non-displayed portion of the video signals wherein the indicia relates to visible video programs being displayed.

* * * * *